United States Patent

[11] 3,625,325

[72] Inventor Richard A. Hersey
 1809 James Ave. South, Minneapolis, Minn. 55403
[21] Appl. No. 7,542
[22] Filed Feb. 2, 1970
[45] Patented Dec. 7, 1971

[54] VARIABLE-TORQUE CENTRIFUGAL FRICTION CLUTCH
 8 Claims, 6 Drawing Figs.

[52] U.S. Cl. ............................................. 192/58 A, 192/58 C, 192/105 A
[51] Int. Cl. ........................................... F16d 31/08, F16d 37/00
[50] Field of Search ................................ 192/58 A, 58 C, 105 A

[56] References Cited
UNITED STATES PATENTS

| Re. 24,157 | 5/1956 | Johnson | 192/58 C |
| 2,895,579 | 7/1959 | Terry | 192/58 A |
| 3,019,875 | 2/1962 | Fowler | 192/58 C |
| 3,319,754 | 5/1967 | Kokochak et al. | 192/58 C |
| 3,400,796 | 9/1968 | Savins et al. | 192/58 C |

FOREIGN PATENTS

| 1,249,263 | 11/1960 | France | 192/58 A |
| 855,253 | 11/1960 | Great Britain | 192/58 A |

Primary Examiner—Allan D. Herrmann
Attorney—Merchant & Gould

ABSTRACT: A rotatable housing connected to a driving member defines a circular cavity in which a circular clutch plate connected to a driven member is mounted for rotation relative to the housing, a clutching medium in the cavity having a fluid state moves radially toward a restricted annular passage defined by the housing and clutch plate responsive to rotation of the housing to cause common rotation of the drive and driven members, and means is provided to impart relative movements axially between the housing and clutch plate for varying the torque required to cause relative rotational movement between the housing and clutch plate.

PATENTED DEC 7 1971 3,625,325
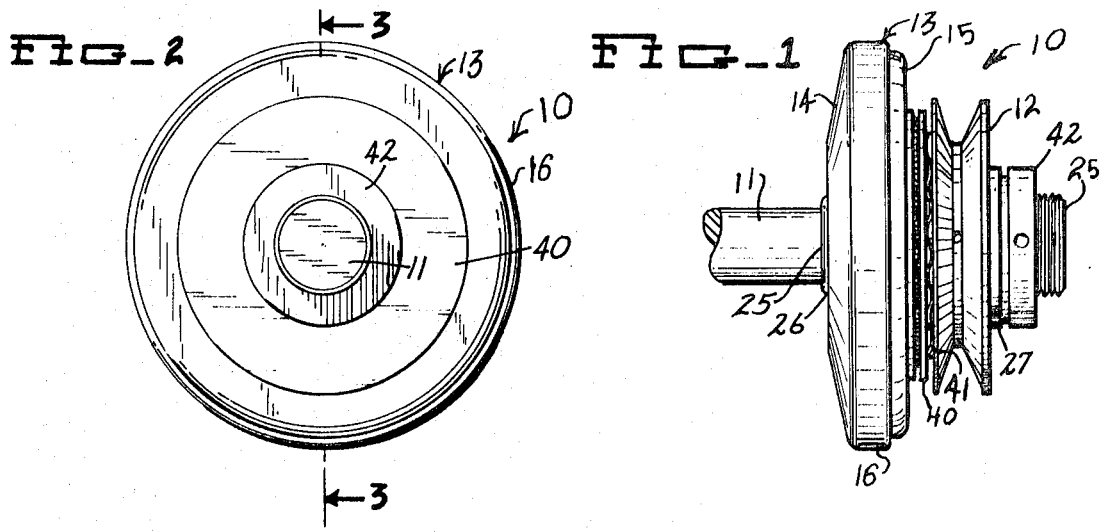
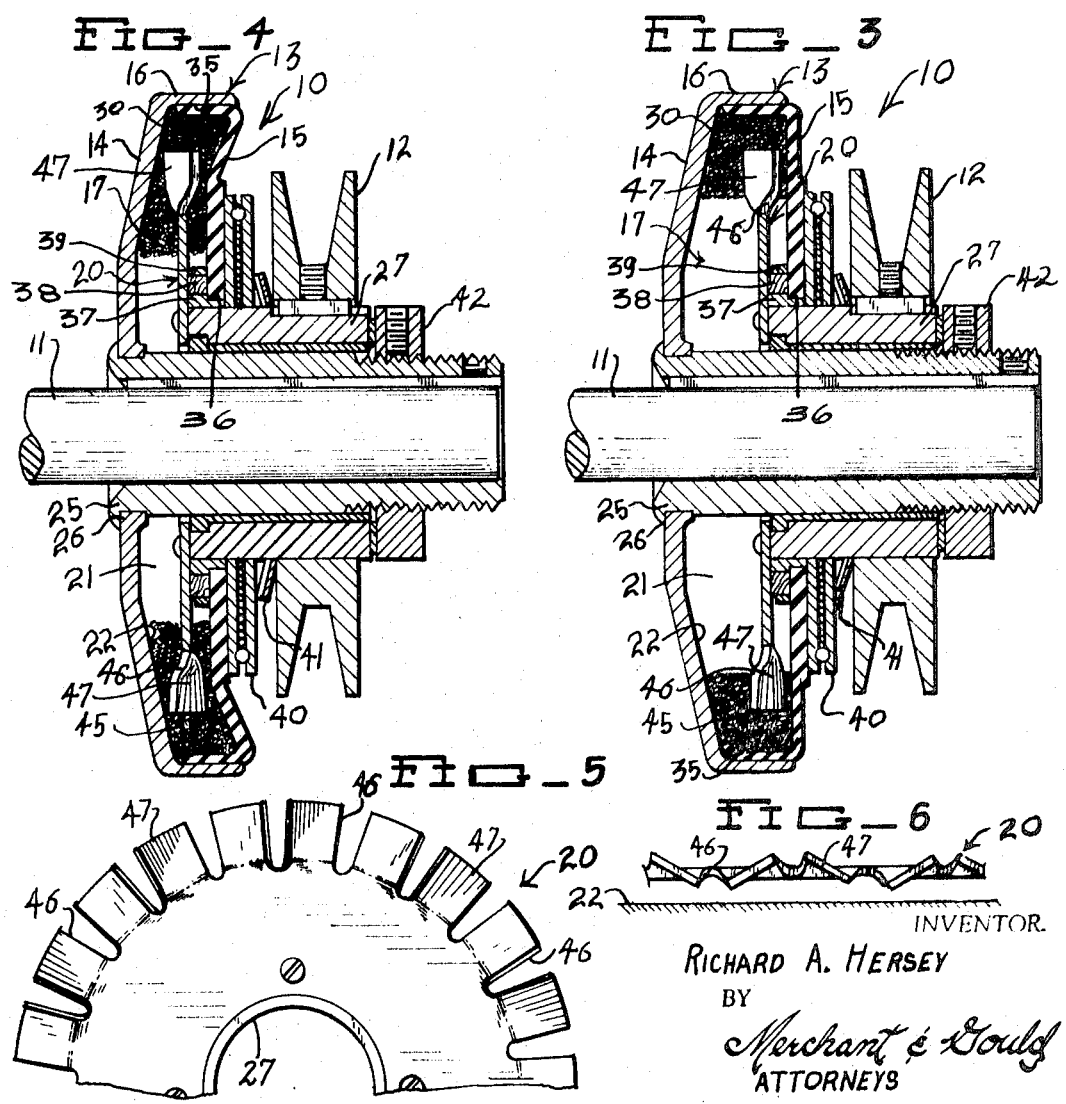
INVENTOR.
RICHARD A. HERSEY
BY
*Merchant & Gould*
ATTORNEYS 3,625,325

VARIABLE-TORQUE CENTRIFUGAL FRICTION CLUTCH

BACKGROUND OF THE INVENTION

1. Field of the Invention

The present invention pertains to centrifugal friction clutches of the type including a clutching medium, having a fluid state, which moves radially outwardly within the clutch, during rotation thereof, to cause common rotation of a drive and driven member connected to the clutch.

2. Description of the Prior Art

In the prior art, one type of centrifugal clutch is that which employs a finely divided powder as a clutching medium. The powder is positioned within a cavity, defined by a housing, which contains a clutch plate mounted for rotation relative to the housing. In one such type clutch the powder clutching material has a volume less than the volume of the cavity in which it is placed and rotation of the clutch housing results in radial movement of the clutching medium and common rotation of the drive and driven member. A particular problem with the above-type clutch is that same must be disassembled when it becomes necessary to vary the torque supplied to the driven member by the drive member. That is, the clutch must be disassembled and the amount of clutching medium either increased or decreased depending upon whether an increased or decreased torque is desired. A further problem has presented itself in that failure of seals often results in loss of the clutching medium and inoperativeness of the clutch. Present clutches of this type do not provide for emergency operation under such conditions and must be completely replaced.

SUMMARY OF THE INVENTION

The present invention provides a clutch having a rotatable housing defining a circular cavity. A clutch plate coaxially mounted in the cavity cooperates with the housing to define an annular passage having an increasing degree of restriction radially outwardly of the housing. A clutching medium in the cavity, having a fluid state and a volumetric displacement less than the volume of the cavity, moves radially outwardly in the restricted annular passage upon rotation of the housing so as to cause common rotational movement of the housing and clutch plate which in turn are connected to a drive and driven member respectively. Means is provided for imparting relative movements to the clutch plate and housing axially thereof so as to vary the torque required to cause common rotational movement of the clutch and housing relative to a load condition on the driven member.

It is a principle object of the present invention to provide a centrifugal friction clutch which provides a controlled gradual acceleration and which may be easily adjusted to vary the torque output thereof.

It is another object of the present invention to provide a device of the class above described which provides a minimum starting load to a driving member during initial rotation thereof, is relatively inexpensive to manufacture, and durable in use.

It is a still further object of the present invention to provide a device of the above character which may be easily adapted to sue as a fixed coupling in an emergency.

These and other highly important objects will become apparent to those skilled in the art upon consideration of the following specification, appended claims and attached drawings.

BRIEF DESCRIPTION OF THE DRAWINGS

Referring to the drawings wherein like characters indicate like parts throughout the several views:

FIG. 1 is a view in side elevation of a centrifugal clutch constructed in accordance with the present invention;

FIG. 2 is a view in end elevation thereof as seen from right to left of FIG. 1;

FIG. 3 is a view in axial section as seen generally around the line 3—3 of FIG. 2, on an enlarged scale;

FIG. 4 is a view similar to FIG. 3 showing a different position of some of the parts;

FIG. 5 is a fragmentary view in end elevation of a clutch plate utilized with the present invention; and FIG. 6 is a fragmentary plan view of the structure shown in FIG. 5.

Referring more particularly to the drawings, there is shown a centrifugal friction clutch indicated generally by the numeral 10. Such clutches 10 are normally interposed between a drive member 11, which may be the output shaft of an electrical motor or the like, and a driven member, such as a pulley 12. Pulley 12 normally has an endless belt, not shown, entrained thereon and another device, also not shown, exerting a load on the pulley 12. Centrifugal clutch 10 is constructed to provide a controlled gradual acceleration to the pulley 12 and load thereon so as to relieve starting loads on the driving device and allow use of starting devices having lower torque outputs.

Centrifugal clutch 10 includes a rotatable housing 13 having opposed end wall portions 14, 15 and a circular sidewall portion 16 which collectively define a cavity 17. A clutch plate 20 is positioned within the cavity 17 and defines, with the housing 13, an annular passage 21. As shown, particularly in FIGS. 3 and 4 of the drawings, one of the end walls 14–15, in this case wall 14, includes a circumferentially extended peripheral portion which has an annular frustoconical surface 22 extending radially and axially toward the clutch plate 20. In this manner, annular passage 21 is restricted in a direction radially outwardly with respect to the housing 13 and clutch plate 20 for reasons which will become apparent hereinafter.

Means for mounting the clutch plate 20 coaxially within the cavity 17 include a first tubular element 25 having one end thereof fixedly secured to the housing 13, coaxially thereof, as at 26. Tubular element 25 extends axially of the circular housing 13 from the end wall portion 14 toward and through a central opening in clutch plate 20 and serves to telescopically mount a second tubular element 27 for relative axial and rotational movements with respect thereto.

Second tubular element 27 is fixedly secured at one end thereof to clutch plate 20, by means of a plurality of bolts or the like, for common movements with respect to the clutch plate 20.

A clutching medium, composed of a predetermined volume of generally spherical steel pellets 30, which collectively have a fluid state, is positioned within the cavity 17. Steel pellets 30 normally gravitate to a lowermost portion of the cavity 17 when the clutch 13 is at rest. Upon rotation of the housing 13 by means of the driving member 11, pellets 30 redistribute themselves by moving radially outwardly in the restricted annular passage 21 to a position wherein they coalesce equally, circumferentially of the housing 13, adjacent sidewall 16. Such movement of the pellets 30 causes a progressively greater frictional engagement between the end wall portion 14 and the clutch plate 20 and eventually common rotational movement of such wall 14 and clutch plate 20.

The pulley or driven member 12 is shown as being connected to the second tubular element 27, at the end thereof opposite the clutch plate 20, for common rotational movements with respect thereto. As shown, driven member 12 is in the nature of a pulley adapted to have an endless belt, not shown, entrained thereon and on a load-producing device, also not shown. It will be appreciated that such driven member 12 may take various other shapes or forms and that the pulley 12 is shown for illustrative purposes only. When a load condition on the pulley 12 exceeds the torque output of the clutch 10, created by the frictional engagement of the steel pellets 30 with the wall portion 14 and clutch plate 20, it becomes desirable to provide some means for increasing the torque output of the clutch 10 to accept such a load condition. To this end means for imparting relative movement to the clutch plate 20 and housing 13 axially thereof, to vary the restriction of the restricted annular passage 21 and the volume of the cavity 17, is provided. In this embodiment, the opposed end wall 15 is formed from a flexible rubberlike material and has a peripheral portion which engages a circumferentially extended inner surface 35 of the circular sidewall portion 16. A central opening 36 in the wall 15 is telescopically received over the second tubular element 27 and is mounted for rotation relative thereto by means of a bearing sleeve or the like 37. A portion of sleeve 37, together with an annular seal 38, and an annular retaining ring 39 are positioned between the wall 15 and clutch plate 20 to maintain same in an axially spaced relationship and to retain he steel pellets 30 within the cavity 17. An annular axial thrust bearing 40 is positioned axially outwardly of the other wall 15 and is maintained in position, in engagement with the wall 15, by means of a spring washer or the like 41. Spring washer 41 is retained in position by driven member 12. A nut 42, including a conventional setscrew, is threadedly engaged over the end of first tubular element, on the end opposite that connected to the housing 13, and serves to impart adjustments to the second tubular element 27 and parts associated therewith axially of the first tubular element 25 to vary the restriction of the restricted annular passage 21. It will be seen, by reference to FIGS. 3, 4, that axial adjustments of the second tubular element 27 and clutch plate 20 carried thereby, toward the opposed sidewall 14 of the housing 13, causes common axial movements of the flexible wall 15 of housing 13 in a manner to reduce the volume of the cavity 17 in the housing 13. Reduction of the volume of cavity 17 causes the clutching medium or steel pellets 30 to frictionally engage a greater surface area of the housing 13 and clutch plate 20 and provide a greater torque output during rotation of the clutch 10.

To provide a more positive torque output of the clutch 10, clutch plate 20 is formed at the peripheral portion thereof with circumferentially spaced projections indicated generally by the numeral 45. Projections 45 are formed by slotting the clutch plate 20 radially as at 46 and twisting the portions 47 intermediate the slots 46 on an axis extending radially of the clutch plate 20. By so forming the portions 47, same cooperate with the wall surface 22 of opposed wall 14 to define a plurality of circumferentially spaced restricted passages that open circumferentially of the cavity 17. REferring particularly to FIG. 6 of the drawings, it will be seen that any relative rotation between the housing 13 and clutch plate 20, during rotation of clutch 10, will cause the clutching medium 30 to coalesce or become more tightly packed within the circumferentially opening restricted passages defined by the portions 47 and surface 22 of opposed wall 14. Such packing of the clutching medium 30 more positively drives the clutch plate 20 and driven member 31 connected thereto in common rotation with the housing 13 and drive member 11 connected thereto.

To adapt the clutch 10 to use with a drive member rotating in either a clockwise or counterclockwise direction, alternate ones of the circumferentially spaced portions 47 are formed or bent to provide restricted passages that open in opposite directions circumferentially of the cavity 17. In this manner, alternate ones of the portions 47 cooperate with the wall surface 22 of the wall 14 to define restricted passages which operate in a clockwise direction of rotation of the clutch 10 and the remaining portions 47 cooperated with surface 22 to define restricted passages which operate in a counterclockwise direction of rotation of clutch 10.

Due to the fluid state of the steel pellets 30, momentary or intermittent overload conditions occurring on the driven member 12 causes the coalescence of pellets 30 to be overcome and relative rotation between the clutch plate 20 and housing 13 of the centrifugal clutch 10. Disappearance of such an overload condition results in immediate normal operation of the clutch 10 or common rotation of the drive and driven members 11, 12, respectively. If failure of the centrifugal clutch 10 should occur, such as due to leakage and loss of the clutching medium from within the cavity 17, clutch 10 may be run under an emergency basis by imparting axial adjustments to the second tubular element 27, through the medium of the nut 42, until the clutch plate 20 physically engages the surface 22.

Presently used centrifugal clutches, generally of the above-described type, require disassembly and either addition to or subtraction from the clutching medium therein to vary the torque output thereof. In the above-described device, a centrifugal clutch is provided in which the torque output may be easily varied without disassembly of the clutch and with a minimum of downtime of the device to which it is attached. Additionally, a centrifugal clutch is provided which provides a controlled smooth acceleration to the driven member with a minimum of initial torque load on the driving member, a substantially identical rotational speed of the driven and drive member at operating speeds, and an overload protection which may be intermittently utilized frequently without undue heat buildup.

What is claimed is:

1. A variable-torque centrifugal friction clutch connecting a driving member and a driven member comprising:
   a. a rotatable housing having opposed end wall portions and a circular sidewall portion which collectively define a cavity;
   b. a clutch plate in said cavity defining with one of said opposed end walls a radially restricted annular passage;
   c. means including sealing means mounting said clutch plate coaxially in said cavity for rotation relative to said rotatable housing, for movements axially of said rotatable housing, and for connection to said driven member;
   d. a clutching medium in said cavity having a fluid state and of a volume less than that of the volume of said cavity whereby rotation of said rotatable housing causes said clutching medium to flow radially outwardly in said restricted annular passage and cause common rotational movement of the drive and driven member; and
   e. means for imparting relative movements to said clutch plate and housing axially thereof to vary the restriction of said annular passage and said volume of said cavity to vary the torque required to cause common rotational movement of said clutch plate and housing relative to a load condition of the driven member.

2. The structure of claim 1 in which at least a circumferentially extended portion of the other of said opposed end wall portions is formed from a flexible material.

3. The structure of claim 1 in which said clutch plate includes a peripheral portion having circumferential space projections which cooperate with said rotatable housing to define one each a restricted passage which opens generally circumferentially of said cavity.

4. The structure of claim 3 in which alternate ones of said restricted passages open in opposite directions circumferentially of said cavity.

5. The structure of claim 1 in which said one opposed end wall portion includes a circumferentially extended peripheral portion having an annular frustoconical surface that extends radially and axially toward said clutch plate.

6. The structure of claim 1 in which said clutching medium is a predetermined volume of generally spherical steel pellets.

7. The structure of claim 1 in which said circular sidewall portion of said circular housing defines a circumferentially extended inner surface and in which the other of said opposed end wall portions is formed from a rubberlike material and has a peripheral portion that engages said inner surface.

8. The structure of claim 7 in which said means mounting said clutch plate coaxially in said cavity includes a first tubular element rigidly connected to said one opposed end wall portion and extending axially of said circular housing, a second tubular element carried by said clutch plate and telescopically received on said first tubular element, and means mounting said second tubular element for rotation relative to said one opposed end wall portion and for common movements of said clutch plate and said other opposed end wall portion axially of said first tubular element.

* * * * *